Aug. 28, 1956  C. PAULY  2,760,430
CHEESE PACKING
Filed June 16, 1951  2 Sheets-Sheet 1

INVENTOR.
Charles Pauly
BY
R. G. Story
ATTORNEY

Aug. 28, 1956 C. PAULY 2,760,430
CHEESE PACKING
Filed June 16, 1951 2 Sheets-Sheet 2

INVENTOR.
Charles Pauly
BY R. L. Story
ATTORNEY

2,760,430

CHEESE PACKING

Charles Pauly, Port Washington, Wis.

Application June 16, 1951, Serial No. 232,040

1 Claim. (Cl. 100—248)

The present invention relates to a device for use in pressing cheese and to remove the whey therefrom and for use in holding the pressed curd during the aging and shipping.

The objects of the present invention include: To provide a device wherein the necessity for the conventional bandaging and paraffining of cheese is unnecessary; to provide a device for the pressing and storing of cheese curd which will greatly reduce the formation of rind on the cheese; to provide a device which will reduce the capital equipment requirements of cheese factories; and to provide means for pressing the cheese curd in a relatively cylindrical rigid container having a loose plastic liner without damaging or displacing the liner during the pressing operation.

Additional objects and advantages will become apparent from the following description taken in conjunction with the drawings in which.

Figure 1:
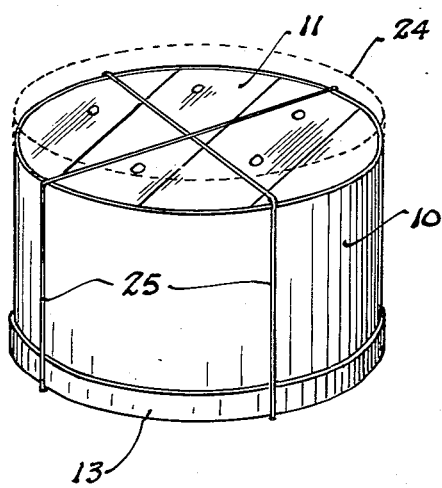
Fig. 1 is a perspective view of the container of the present invention closed and bound for storage or shipment.
Figure 2:
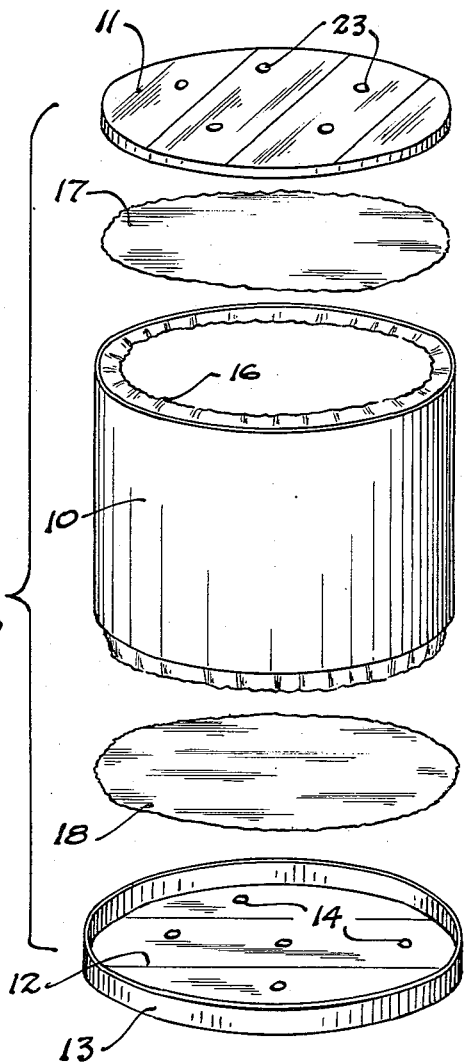
Fig. 2 is an exploded view of the container of Fig. 1.

In the present invention, a single container is used both as the cheese hoop and as the shipping container. This container comprises a generally tubular shell 10 having a pair of ends 11 and 12. End 12 has an upstanding rim 13 and has a plurality of holes 14 therein to permit the passage of fluid therethrough. The inner diameter of rim 13 is just sufficiently larger than the outer diameter of tube 10 to permit the cap-like end to be slipped over the shell.

The shell 10 is cylindrical in the illustrated embodiment although in some instances it may be desired to have the shell of other shapes. The shell 10 is preferably made of a fiber board as in the rim 13 of the cap-like end. Ends 11 and 12 are preferably wood.

A substantially fluid impervious plastic liner 16 fits about the inner wall of the shell 10. Preferably this plastic liner is a sheet of rubber hydrochloride sold under the trademark "Pliofilm." Similarly, there are a pair of plastic liners 17 and 18 for ends 11 and 12 respectively.

Figures 3, 4:
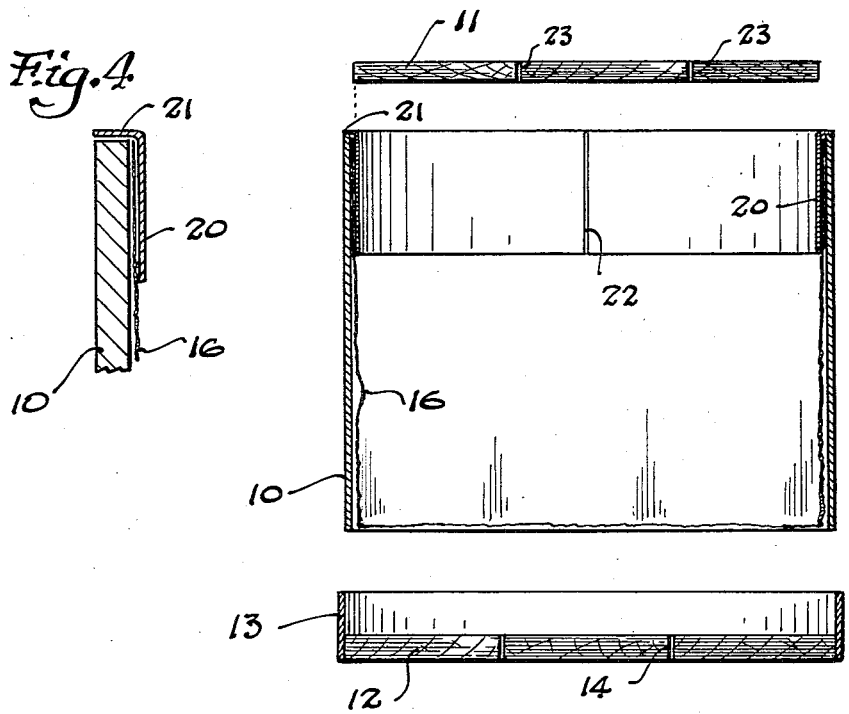
Fig. 3 is an exploded section of the container of the present invention preparatory to pressing cheese therein.
Fig. 4 is an enlarged section of the wall of the container showing the liner and protective ring inserted therein.

A second shell or ring 20 having an external configuration the same as, only smaller than, the internal shape of the fiber shell 10 is used to protect the liner 16 as the hoop is filled with cheese and pressed. Ring 20 has an outwardly projecting flange 21 which overlaps the sides of the shell 10, as shown in Fig. 4, to prevent the ring from sliding into the fiber shell. Across one side of ring 20 is a slit in the ring, as indicated at 22, to permit the ring to be bent together to reduce the external diameter thereof.

Ring 20 must be sufficiently long, with respect to the length of shell 10, so that the end 11 will not enter the unprotected portion of the lined shell as the curd is pressed, as hereinafter described. However, if it is too long, it is difficult to remove after the pressing takes place and the liner will not be in complete contact with the sides of the pressed curd. Preferably the ring 20 is about one-third the length of shell 10.

The wooden follower 11 is slightly smaller in diameter than the inner diameter of ring 20 to permit the follower to slide into the hoop when the ring is in place. Follower 11 is provided with a plurality of holes 23 to permit fluid to escape therethrough.

Figure 5:
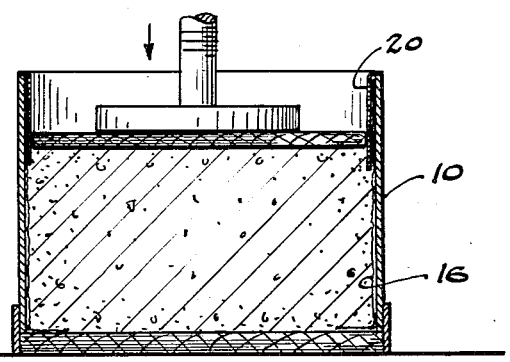
Fig. 5 is a sectional view of the container with cheese being pressed therein.

The use of the device is as follows: The liner 16 is inserted into the shell 10 and held in place by split ring 20. In inserting the ring 20, the ring is reduced in size, slipped into the lined shell and allowed to expand. End 12 is slipped over shell 10 without, however, inserting bottom liner 18. The hoop is then filled with cheese curd to approximately the level of the top thereof. Wood follower 11 is placed over the top of the curd and the assembly is placed in a cheese press as indicated diagrammatically in Fig. 5.

After the desired amount of pressing has taken place, the assembly is removed from the press and end 11 and split ring 20 are removed from the shell 10. The top portion of liner 16 is folded down over the top of the pressed cheese and top liner 17 and follower 11 are placed thereon. The extra portion of the shell 10 indicated by the dotted line 24 in Fig. 1 is cut off. The shell is inverted, the bottom cover 12 removed and liner 18 is placed over the end of the cheese, after which the bottom cover 12 is replaced. A plurality of tight metal bands 25 are placed about the assemblage and securely fastened in place.

I claim:

A device for use as a combination cheese hoop and aging and shipping container for cheese curd, said device comprising: a substantially cylindrical fiber shell; a first plastic open ended liner foldable about the ends of said cheese; a perforated wooden bottom having a projecting flange about the periphery thereof, the inner diameter of said flange being greater than the outer diameter of said shell; a second plastic liner registerable with said bottom to seal the perforations thereof; a substantially cylindrical metal shell the external diameter of said shell being less than the inner diameter of the lined fiber shell, said metal shell being split to permit its diameter to be reduced to allow it to be slipped inside the lined fiber shell without disturbing said liner and flanged at one end to thereby be engageable with the upper rim of said lined fiber shell; a circular perforated wooden follower having a diameter less than the inner diameter of said metal shell and suitable for both exerting pressure and forming a removable upper closure; a third plastic liner registerable with said follower to seal the perforations thereof; and means for retaining said fiber shell, bottom and follower in assembled relation for transportation.

References Cited in the file of this patent

UNITED STATES PATENTS

| Number | Name | Date |
| --- | --- | --- |
| 85,201 | Bent | Dec. 22, 1868 |
| 214,381 | Freeman | Apr. 15, 1879 |
| 1,061,929 | Simon et al. | May 13, 1913 |
| 1,625,130 | Meyers | Apr. 19, 1927 |
| 2,255,492 | Peters | Sept. 9, 1941 |
| 2,270,935 | Doering | Jan. 27, 1942 |
| 2,361,749 | Davis | Oct. 31, 1944 |
| 2,382,308 | Gavaart | Aug. 14, 1945 |
| 2,424,693 | Jones | July 29, 1947 |
| 2,520,183 | Toone | Aug. 29, 1950 |

FOREIGN PATENTS

| 332,213 | Great Britain | July 14, 1930 |